(12) United States Patent
Wynne

(10) Patent No.: US 6,606,963 B1
(45) Date of Patent: Aug. 19, 2003

(54) SHARK REPELLENT SYSTEM

(76) Inventor: Brian M. Wynne, 1 Meadowbrook Dr., Huntington Station, NY (US) 11746-2916

( * ) Notice: Subject to any disclaimer, the term of this patent is extended or adjusted under 35 U.S.C. 154(b) by 0 days.

(21) Appl. No.: 10/156,319

(22) Filed: May 24, 2002

(51) Int. Cl.$^7$ .......................... A01K 61/00; A01K 37/00
(52) U.S. Cl. ...................... 119/220; 119/719; 119/908
(58) Field of Search ................................. 119/219, 220, 119/719, 721, 905, 908

(56) References Cited

U.S. PATENT DOCUMENTS

| | | | |
|---|---|---|---|
| 3,164,772 A | 1/1965 | Hicks, IV | 325/118 |
| 3,822,403 A | 7/1974 | Coleman | 325/28 |
| 4,211,980 A | 7/1980 | Stowell | 455/40 |
| 4,630,571 A | * 12/1986 | Palmer | 119/712 |
| 5,158,039 A | 10/1992 | Clark | 119/29 |
| 5,460,123 A | * 10/1995 | Kolz | 119/220 |
| 5,566,643 A | 10/1996 | Charter et al. | 119/220 |
| 5,730,086 A | * 3/1998 | Truebe | 119/219 |
| 5,818,354 A | * 10/1998 | Gentry | 119/220 |
| 6,151,276 A | * 11/2000 | Peinetti | 119/908 |

OTHER PUBLICATIONS

NPR Program Web Site, Mar. 29, 2002, All Things Considered.
www.itc-trasducers.com, May 9, 2002, Spherical Omnidirectional Transducer.

* cited by examiner

Primary Examiner—Charles T. Jordan
Assistant Examiner—Elizabeth Shaw

(57) ABSTRACT

A shark repellent system for repelling sharks away from an individual during a water activity. The shark repellent system includes a band member and a transmitter unit attached to the band member that transmits underwater sound waves at a frequency undesirable to sharks. The band member is preferably comprised of an elastic material for snugly fitting about an ankle or wrist of an individual. The transmitter preferably includes a control knob connected to a frequency generator for allowing manipulation of the frequency of the sound waves generated by the transmitter unit underwater.

12 Claims, 5 Drawing Sheets

SHARK REPELLENT SYSTEM

CROSS REFERENCE TO RELATED DISCLOSURE DOCUMENT

The present application specifically references and incorporates by reference United States Discloser Document No. 499,634 filed on Sep. 5, 2001.

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to animal repellent devices and more specifically it relates to a shark repellent system for repelling sharks away from an individual during a water activity.

2. Description of the Related Art

Underwater acoustic beacons have been in use for years. An underwater acoustic beacon is a device which continually sends out a repetitive signal at a preset frequency. These devices are often times referred to as "pingers" which are often times utilized to mark locations or objects underwater for later recovery or relocation.

Sonar is a system that transmits frequency sound waves in water and registers the vibrations reflected back from an object. Sonar is used in detecting objects such as submarines, locating schools of fish, or determining water depth.

Examples of patented devices which may be related to the present invention include U.S. Pat. No. 3,164,772 to Hicks IV; U.S. Pat. No. 3,822,403 to Coleman; U.S. Pat. No. 4,211,980 to Stowell; U.S. Pat. No. 5,566,643 to Charter et al.; and U.S. Pat. No. 5,158,039 to Clark.

U.S. Pat. No. 4,211,980 illustrates the usage of an electric field for repelling a shark. The electric field is operated near a shark's nervous system's normal frequency which over stimulates the nervous system of the shark. Unfortunately, electric fields have a relatively limited range about the body of a swimmer.

While these devices may be suitable for the particular purpose to which they address, they are not as suitable for repelling sharks away from an individual during a water activity. Conventional shark repellent systems have focused upon the usage of electric fields which have a limited range around a swimmer.

In these respects, the shark repellent system, according to the present invention substantially departs from the conventional concepts and designs of the prior art, and in so doing provides an apparatus primarily developed for the purpose of effectively repelling sharks away from an individual during a water activity.

BRIEF SUMMARY OF THE INVENTION

In view of the foregoing disadvantages inherent in the known types of shark repelling devices now present in the prior art, the present invention provides a new shark repellent system construction wherein the same can be utilized for repelling sharks away from an individual during a water activity.

The general purpose of the present invention, which will be described subsequently in greater detail, is to provide a new shark repellent system that has many of the advantages of the shark repelling devices mentioned heretofore and many novel features that result in a new shark repellent system which is not anticipated, rendered obvious, suggested, or even implied by any of the prior art shark repelling devices, either alone or in any combination thereof.

To attain this, the present invention generally comprises a band member and a transmitter unit attached to the band member that transmits underwater'sound waves at a frequency undesirable to sharks. The band member is preferably comprised of an elastic material for snugly fitting about an ankle or wrist of an individual. The transmitter preferably includes a control knob connected to a frequency generator for allowing manipulation of the frequency of the sound waves generated by the transmitter unit underwater.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a shark repellent system that will overcome the shortcomings of the prior art devices.

A second object is to provide a shark repellent system for repelling sharks away from an individual during a water activity.

Another object is to provide a shark repellent system that is easily attached and maintained upon the body of a swimmer.

An additional object is to provide a shark repellent system that emits sound waves at a frequency that is aggravating and deterring to sharks.

A further object is to provide a shark repellent system that deters sharks from approaching a swimmer.

Another object is to provide a shark repellent system that transmits deterring sound waves omnidirectional.

A further object is to provide a shark repellent system that may be adjusted.

Another object is to provide a shark repellent system that does not interfere with the normal operation of the human body.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood When considered in conjunction with the accompanying drawings, in which like reference characters designate the same or similar parts throughout the several views, and wherein.

DETAILED DESCRIPTION OF THE INVENTION

Figure 1:
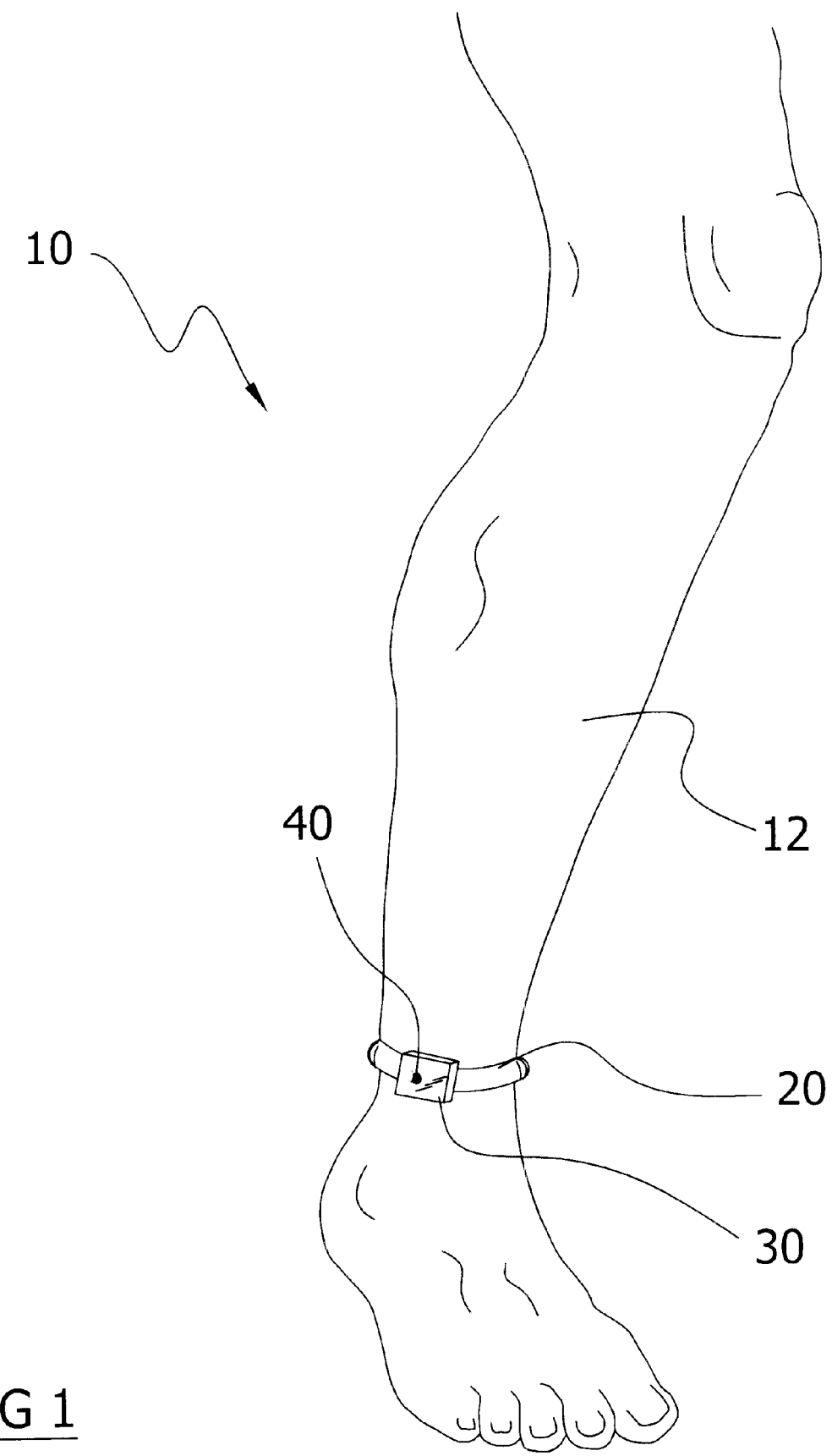
FIG. 1 is an upper perspective view of the present invention attached about the ankle of an individual.

Turning now descriptively to the drawings, in which similar reference characters denote similar elements throughout the several views, FIGS. 1 through 5 illustrate a shark repellent system 10, which comprises a band member 20 and a transmitter unit 30 attached to the band member 20 that transmits underwater sound waves at a frequency undesirable to sharks. The band member 20 is preferably comprised of an elastic material for snugly fitting about an ankle or wrist of an individual. The transmitter preferably includes a control knob 40 connected to a frequency generator 34 for allowing manipulation of the frequency of the sound waves generated by the transmitter unit 30 underwater.

Figure 4:
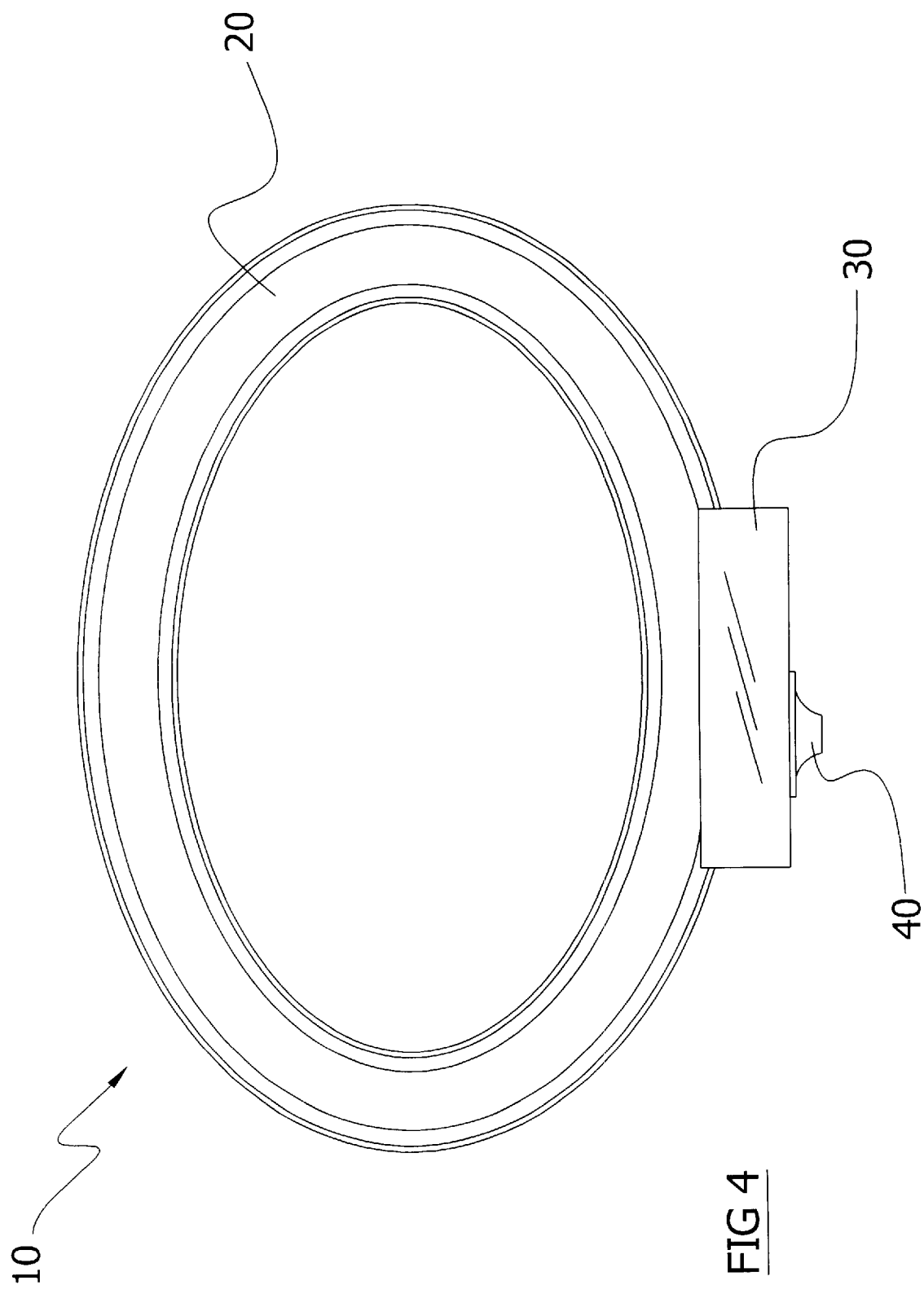
FIG. 4 is a side view of the present invention.

As shown in FIGS. 1 through 4 of the drawings, the band member 20 is a generally oval shaped structure. The band member 20 may have various shapes such as circular, square, or rectangular, however the preferred shape of the band member 20 is an oval shape for conforming to the natural shape of a wrist or ankle of a leg 12 as best shown in FIG. 4 of the drawings.

The band member 20 is preferably comprised of a single solid structure that is attached to a bottom side of the transmitter unit 30. The band member 20 is preferably comprised of a circular cross sectional area for providing easy attachment to and removal from an individual along with providing increased comfort.

The band member 20 is also preferably comprised of an elastic material for allowing a snug fit about the wrist or ankle of the individual. The elastic material may be comprised of various materials such as but not limited to rubber.

The transmitter unit 30 is attached preferably to a broad side of the band member 20 as best illustrated in FIG. 4 of the drawings. The transmitter unit 30 may have various shaped housing structures as can be appreciated other than illustrated in FIGS. 1 through 4 of the drawings. The transmitter unit 30 is comprised of a water proof housing structure for preventing damage to the interior electronic components.

The transmitter unit 30 emits sound waves in a directional or omnidirectional manner. It is preferably that the transmitter unit 30 emits the sound waves in an omnidirectional manner so as to ensure that sharks near the individual are thoroughly deterred regardless of their location with respect to the individual. The sound waves are preferably at a frequency that is unpleasant to a shark. The transmitter unit 30 preferably emits sound waves within the lower frequency band such as but not limited to between 30 to 500 hertz which have been found to be undesirable to sharks.

Figure 5:
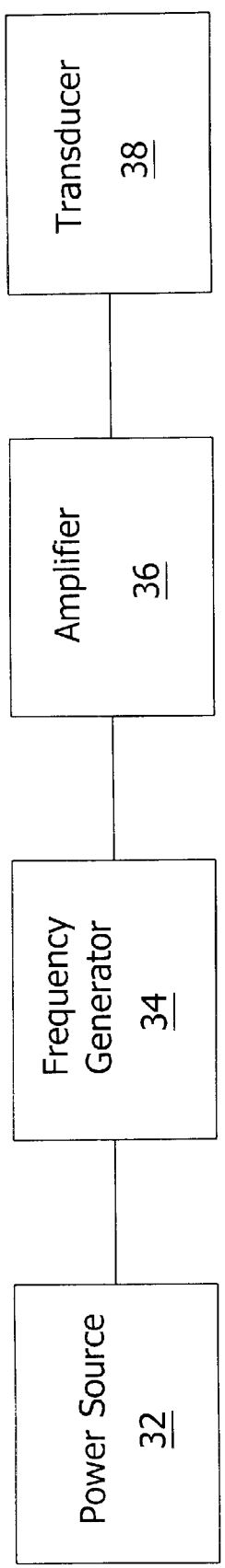
FIG. 5 is a block diagram of the electronic circuitry for the present invention.

The transmitter unit 30 preferably includes a power source 32, a frequency generator 34, an amplifier 36 and a transducer 38 as illustrated in FIG. 5 of the drawings. The power source 32 may be comprised of any type of portable source such as a battery. A power switch may be electrically connected between the power source 32 and the frequency generator 34 to allow for the control power to the frequency generator 34.

The frequency generator 34 is electrically connected to the power source 32 and may be comprised of any type of generator circuitry commonly utilized to generator varying frequencies. The frequency signals generated by the frequency generator 34 are preferably comprised of a pulsed manner to reduce power consumption and thereby extend the life of the power source 32. However, the frequency signals generated by the frequency generator 34 may be in a random or constant manner. It can be appreciated that the frequency generator 34 may be comprised of a single frequency generating system that is non-adjustable.

Figure 2:
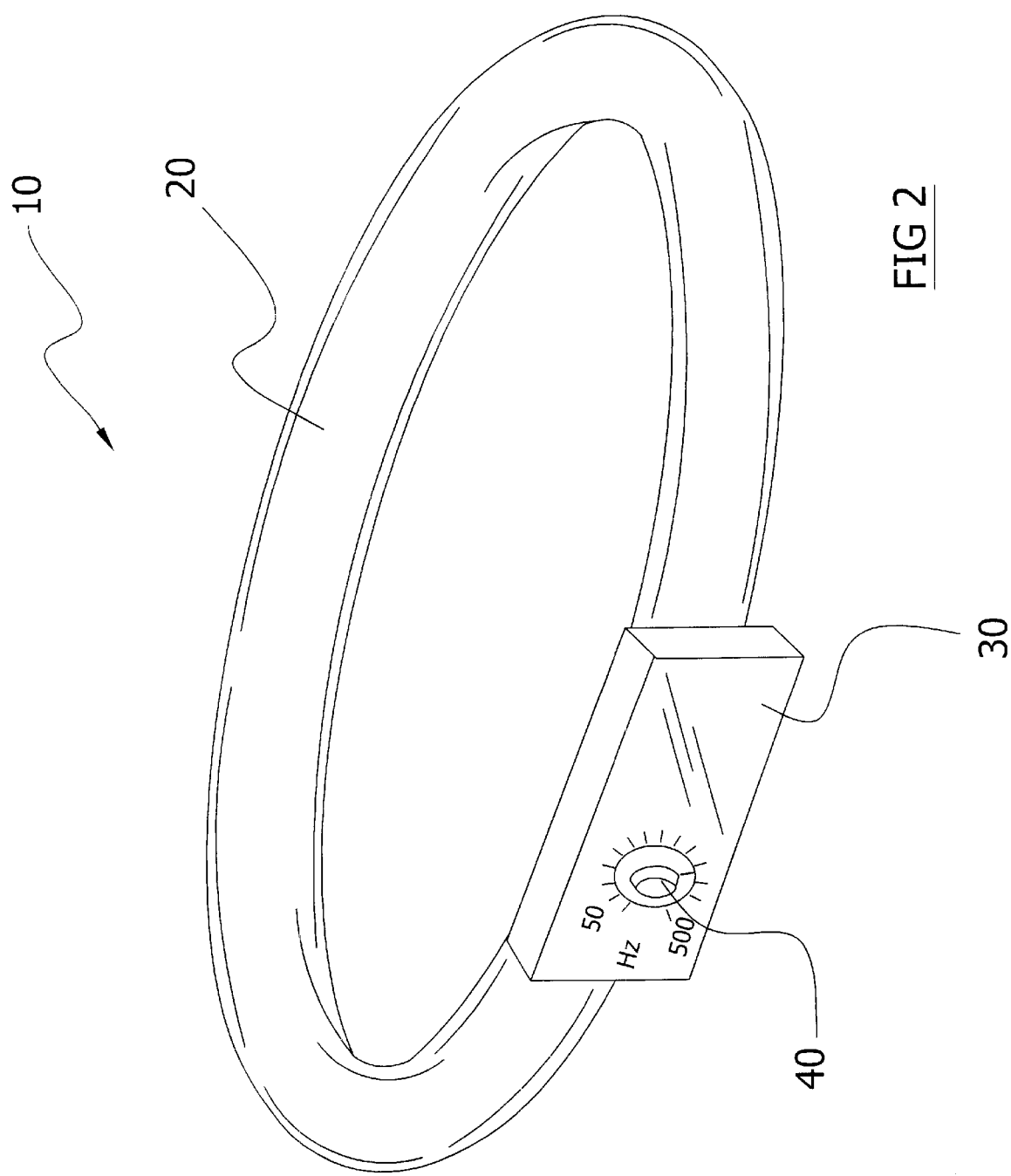
FIG. 2 is an upper perspective view of the present invention.
Figure 3:
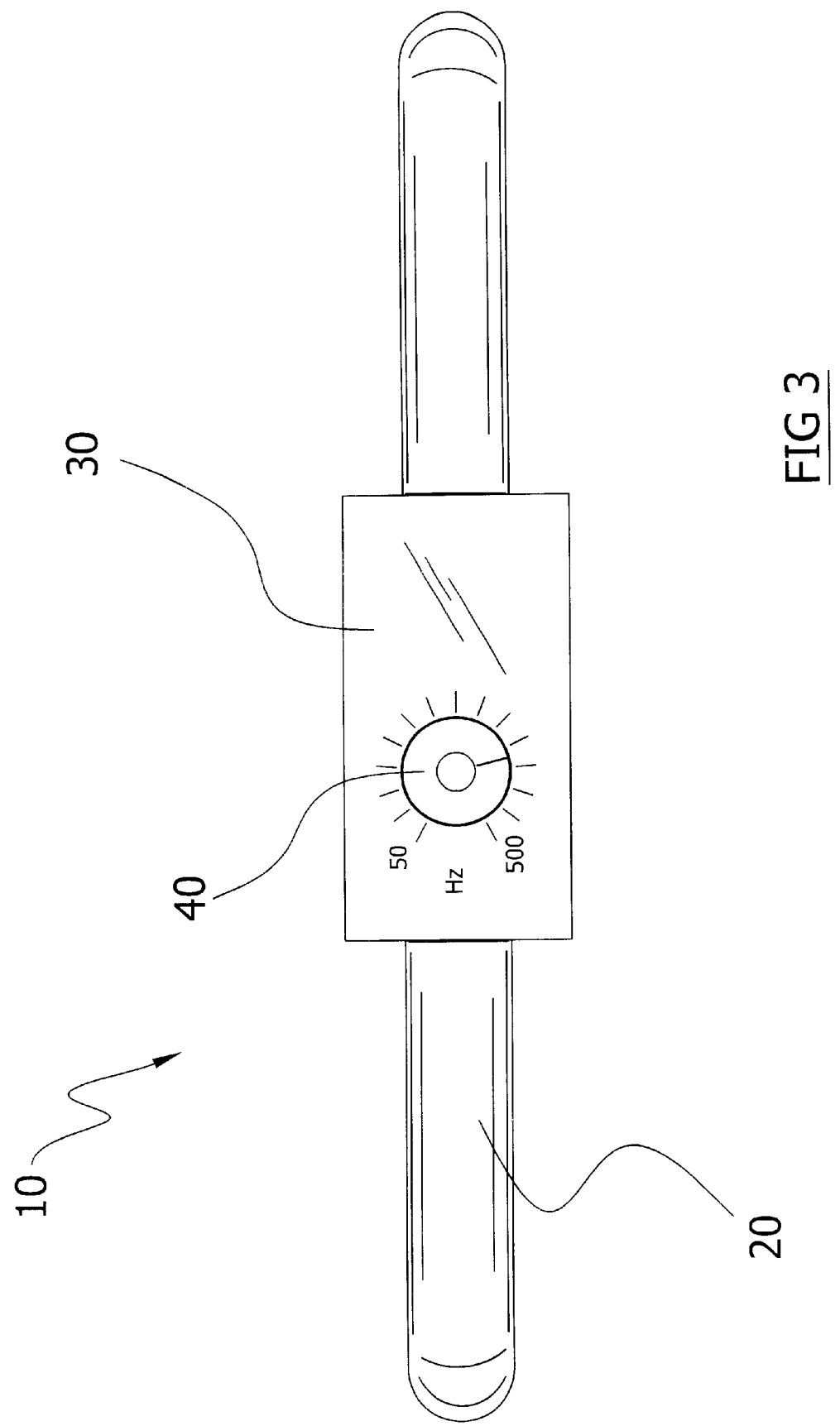
FIG. 3 is a top view of the present invention.

The frequency generator 34 is controlled by a control knob 40 or similar structure as shown in FIG. 2 of the drawings. Indicia upon the housing of the transmitter unit 30 indicates to the user the frequency of the sound waves being generated by the transmitter unit 30. The amplifier 36 is electrically connected to the frequency generator 34 for increasing the frequency output from the frequency generator 34.

The transducer 38 is electrically connected to the amplifier 36 for emitting the sound waves within the water. The transducer 38 is preferably positioned within the housing of the transmitter unit 30 in such a manner as to encourage omnidirectional sound wave generation with limited obstruction by the body of the individual. The transducer 38, may be comprised of any well-known structure utilized for generating sound waves within water such as pinger devices.

In use, the user positions the shark repellent system 10 about their ankle or wrist by expanding the band member 20 to fit about the body part. The user then actuates the transmitter unit 30 and then enters the water. When the transmitter unit 30 is submerged within the water, the transducer 38 generates sound waves at the preset frequency which deter sharks from the individual. The sound waves are emitted omnidirectional about the user for a finite distance thereby deterring sharks from approaching the individual. When the individual is out of the water, the transmitter unit 30 is turned off and removed from the ankle or wrist by sliding the band member 20 about the respective body part.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling Within the scope of the invention.

I claim:

1. A shark repellent system for use upon a human in a volume of water for deterring sharks, comprising:
   a band member comprising an elastic material for snugly fitting about a body part; and
   a transmitter unit capable of transmitting sound waves within a volume of water in a pulsing manner within water at a frequency undesirable to sharks, wherein said frequency is adjustable and between 30 Hz to 500 Hz;
   wherein said transmitter unit is comprised of:
      a power source;
      a frequency generator electrically connected to said power source;
      an amplifier electrically connected to said frequency generator; and
      a transducer electrically connected to said amplifier for generating said sound waves within a volume of water for deterring sharks.

2. The shark repellent system of claim 1, wherein said band member is comprised of an oval structure.

3. The shark repellent system of claim 1, including a control knob within said transmitter unit for allowing adjustment of said frequency.

4. The shark repellent system of claim 1, wherein said frequency is approximately 40 Hz.

5. The shark repellent system of claim 1, wherein said transmitter unit is attached to an outer portion of said band member.

6. The shark repellent system of claim 1, wherein said band member has a circular cross sectional area.

7. A shark repellent system for use upon a human in a volume of water for deterring sharks, comprising:
   a band member comprising an elastic material for snugly fitting about a body part; and
   a transmitter unit capable of transmitting sound waves within a volume of water in a constant manner within water at a frequency undesirable to sharks, wherein said frequency is adjustable and between 30 Hz to 500 Hz;
   wherein said transmitter unit is comprised of:
      a power source;
      a frequency generator electrically connected to said power source;
      an amplifier electrically connected to said frequency generator; and
      a transducer electrically connected to said amplifier for generating said sound waves within a volume of water for deterring sharks.

8. The shark repellent system of claim 7, wherein said band member is comprised of an oval structure.

9. The shark repellent system of claim 7, including a control knob within said transmitter unit for allowing adjustment of said frequency.

10. The shark repellent system of claim 7, wherein said frequency is approximately 40 Hz.

11. The shark repellent system of claim 7, wherein said transmitter unit is attached to an outer portion of said band member.

12. A method of operating a shark repellent unit for deterring sharks from approaching an individual, said shark repellent unit comprising a band member for snugly fitting about a body part and a transmitter unit capable of transmitting sound waves within water at a frequency undesirable to sharks, said method comprising the steps of:
   (a) attaching said shark repellent unit to said body part;
   (b) switching said transmitter unit into an on position; and
   (c) generating sound waves at a frequency undesirable to a shark, wherein said frequency is between 30 Hz to 500 Hz.

* * * * *